United States Patent [19]

Schumacher

[11] Patent Number: 5,058,030

[45] Date of Patent: Oct. 15, 1991

[54] OPTIMIZING MAIL PROCESSING BY MATCHING PUBLISHER AND INSERTER ENTITIES

[75] Inventor: Karl H. Schumacher, Westport, Conn.

[73] Assignee: Pitney Bowes Inc., Stamford, Conn.

[21] Appl. No.: 416,735

[22] Filed: Oct. 3, 1989

[51] Int. Cl.$^5$ .............................................. G06F 15/21
[52] U.S. Cl. .................................... 364/478; 364/401; 364/464.02
[58] Field of Search .............. 364/478, 464.02, 464.03, 364/466, 401, 402, 200 MS File, 900 MS File; 235/375, 432; 270/54–58; 53/266 A, 504; 209/584, 900

[56] References Cited

U.S. PATENT DOCUMENTS

| | | | |
|---|---|---|---|
| 4,639,873 | 1/1987 | Baggarly et al. | 364/478 |
| 4,797,832 | 1/1989 | Axelrod et al. | 364/478 |
| 4,800,504 | 1/1989 | Durst, Jr. et al. | 364/478 |
| 4,817,042 | 3/1989 | Pintsov | 364/478 |

Primary Examiner—Joseph Ruggiero
Attorney, Agent, or Firm—Peter Vrahotes; Melvin J. Scolnick; David E. Pitchenik

[57] ABSTRACT

A system and method is described for optimizing mail processing by applying a co-mail concept. A network is established involving a data center and plural publishers and inserters of advertising documents. Databases are established at the data center of profiles of the publishers and inserters and their current and prospective activities, and the information used by the data center to match publisher to inserters for particular jobs to reduce mail processing and distribution costs, or expedite mail distribution.

9 Claims, 6 Drawing Sheets

OPTIMIZING MAIL PROCESSING BY MATCHING PUBLISHER AND INSERTER ENTITIES

This invention relates to article processing and delivery, and specifically to improvements in mail processing systems to reduce costs and which will relieve official postal facilities of certain mail handling tasks.

BACKGROUND OF THE INVENTION

As discussed in commonly-assigned U.S. patent application Ser. No. 285,891, filed Dec. 16, 1988, U.S. Pat. No. 5,008,827 the contents of which are herein incorporated by reference, the United States currently has the world's largest postal system. The U.S. Post Offices currently handle in excess of 100 billion pieces of mail per year, about half the total volume handled throughout the world. The servicing of mail delivery involves three essential steps; collection, sorting and delivery. Collection takes place through a series of Post Offices spread throughout the United States. The United States has about 30,000 Post Offices that provide mail services in addition to 9,000 smaller postal centers which provide some type of mail service. Postal employees typically take letters and packages from mail box facilities to the nearest local office where it is accumulated for the sorting procedure. At the Post Office, postal clerks remove collected mail from sacks, bundle packages and segregate mail by size and class into separate categories. The mail travels by truck from local post offices to a central facility known as a sectional center. The United States has 264 sectional centers, some of which serve hundreds of local Post Offices. The sectional center processes nearly all the mail coming or going from its region. At the sectional center, high speed automated equipment sorts large volumes of mail. A computerized machine known as a zip mail translator sorts the postmarked letters according to their destination post office. Postal workers selectively activate the machine's keyboard to send each letter on a conveyor belt into one of many bins. Each bin holds mail for a different Post Office or postal region. Mail addressed to locations outside the regions served by the sectional center are transported by truck, airplane or train by various carriers via various routes to other sectional centers for further sorting. Finally, postal clerks hand sort mail for the area served by the local office into bundles for each delivery route.

Current estimates indicate that the foregoing processing tasks necessarily involve in excess of half a million employees. Cost of maintaining and supporting sorting services at the central post office facilities, even including large scale use of automated equipment, has become staggering. Projections of substantial increases in volumes of mail being transported through central facilities, even with the advent of private delivery, telecommunications services, facsimile services and the like indicate a rapid expansion will be required of such facilities. Since the Postal Service is a private corporation and is expected to become self-supporting, rapidly advancing postal rates place greater and greater burdens on both users and the Postal Service in order to support such volumes of mail. In recognition of capabilities of certain high volume users to provide services to central postal facilities, which services may improve efficiency and reduce the amount of processing time required by the central serving facilities, the U.S. Postal Service offers substantial reductions in rates or discounts, provided that a user comply with certain requirements which will allow the U.S. Postal Service to take advantage of certain user-provided facilities to reduce its own work load. The concept of work sharing, wherein a user provides certain of the processing activities prior to delivering the mail to the postal system, has been proposed in the copending application and is therefore a positive innovation in the field of mail processing which may have a substantial impact in the future implementation of mail services.

Under present systems in use, entities involved in creating batch mailings unwittingly contribute to the increasing workload of the Postal System. In mass mailings especially of advertisements (ads), it is common to print the hardcopy ads at a printer local to the ad publisher, and package ad mail at one or a few professional mailer entities. If, for example, the ads are destined for distribution over a wide geographical area, but the mailings are generated at one or only a few locations, it means that the Postal Service assumes the major burden of processing and delivery to the addressees.

Another factor contributing to inefficient distribution is envelope capacity. Frequently, ads are generated at several different locations, separately enveloped or packaged (meaning machine stuffed in mailing envelopes or packages), addressed, and then dropped off at a local Post Office. Often these separately enveloped ads are intended for the same addressees. So, the Postal Service ends up delivering separate mailings to the same addressee, resulting in multiple processing of documents delivered over the exact same route.

DESCRIPTION OF RELATED APPLICATIONS

Systems relating to work share features are discussed in copending commonly-assigned applications Ser. Nos. 234,977, U.S. Pat. No. 5,005,124, U.S. Pat. No. 5,008,827, and Ser. No. 285,891, filed Aug. 23, 1988 and Dec. 16, 1988, respectively, the contents of which are hereby incorporated by reference. These applications relate to the concept of using certain limited user provided services but does not encompass the full range of work sharing and data sharing services and concepts presented herein.

Commonly-assigned U.S. Pat. No. 4,713,761 describes a system for determining and accounting for the costs of shipping goods, which focuses mainly on a centralized accounting facility for multiple shippers and carriers.

Commonly-assigned U.S. application Ser. No. 285,486, filed Dec. 16, 1988 describes and claims another data sharing system via a centralized database to improve user performance, the contents of which are incorporated herein by reference.

Concurrently-filed, commonly-assigned U.S. application, Ser. No. 416,732 describes and claims other aspects of systems for improving delivery efficiency.

Commonly-assigned U.S. Pat. Nos. 4,800,504; 4,800,505; and 4,800,506 describe computerized systems for preparing stationery items and their subsequent processing into mailpieces.

SUMMARY OF THE INVENTION

It is therefore an object of the present invention to provide a system and method that enables a more efficient and effective use of the facilities of the post office.

A further object of the invention is a system and method for optimizing delivery of bulk mail from mailers to a post office.

Another object of the invention is to reduce costs for entities involved in generating batch mailings.

Still another object of the invention is expedited delivery of mass mailings to their respective destinations.

The present invention extends the work-sharing concept by what can be termed the concept of co-mail, meaning, cooperation of the many entities involved in the creation of batch mailings in order to minimize costs or expedite mailings or reduce the Postal Service workload. This is accomplished by building on the data communications network described in several of the above-related applications to include on the existing network or as part of an independent network various entities involved in the creation or generation of mass or batch mailings.

In accordance with one aspect of this invention, a data center is provided in a data communications network with a plurality of entities involved in the business of generating ads or cyclical mailings for certain kinds of addressees. In addition, a plurality of inserters are also linked to the network. By "inserter" is meant those business entities that possess modern inserter equipment, typically under computer control, that has the capability to selectively collate ad sheets from stations distributed along a conveyer, and then insert or stuff the collation, folded or unfolded, into an envelope, which, typically, is then sealed. In addition, such equipment often include scales, printers for permit mailings, or postage meters. The envelope content is frequently determined by the particular addressee list for which the collation is destined. Knowledge of the existence of a mass mailing of mail pieces intended for particular addressees is a valuable commodity, because there may be other entities in the mailing business who also have or can generate additional items that can be included in those same envelopes at little additional cost due to the sophisticated capabilities of intelligent inserter equipment. In other words, if these additional items were simply added to the insertion line, and the computer accordingly adjusted, they could very easily be added to the very same envelopes.

What the system of the invention provides is an on-line mechanism for informing entities using inserters of inserter activities and the nature of those activities that can profitably be availed of by those entities. It does this by establishing a database containing information concerning the business operations of the inserter entities, including location, the inserter equipment available, and addressee files available, that is, lists of addressees owned or accessible to the inserter entity and to whom it frequently directs mail articles. The database could also include what other mail processing equipment is available to the inserter. In addition, the data center establishes a database of inserter entity users, such as publishers, which could include their location, kinds of ads generated for what kinds of customers to what particular sets of addressees. As a result of processing of the data, the system will allow inserters to, in effect, broadcast through the network current jobs, addressee profiles for whom intended, and excess envelope capacity available for third party advertising. To perform this function, the data center does not require the actual addressee file (listing of addressees by name and address), but only the number of addressees and their profile, such as, location, income level, housing status, etc.

In accordance with another aspect of this invention, the data center maintains regular communication with both the publisher and inserter entities via the network. This allows the data center to maintain up-to-date information not only on current jobs in execution but also on prospective jobs to be carried out and backlog of jobs to be executed. As much of this information may be business proprietary, the data center, being independent of both the publishers and the inserters, can by known security devices easily maintain such information confidential. Armed with these information databases, it is a relatively simple matter using conventional database processing to process the databases to select or match one or more inserter entities to execute a particular job of one or more publishers. Typical matching criteria are: job completion time, job costs, mailing and distribution costs, and mail delivery times. An important criteria would be the mailing profiles of the ultimate addressees who will receive the ads.

In accordance with another aspect of the invention, the data center would also maintain a database of the job content of now executing or soon to be executing prospective jobs. By "content" is meant the size and weight of the printed ads, for what kind of addressees are the ads intended, envelope requirements, etc. This would allow the data center to inform publishers of inserters who are preparing job mailings that would have additional capacity in their mail pieces to add additional material at no additional postage or at minimum additional postage. The publisher could then send its mailings to that inserter for inclusion in the envelopes. Or, it may be that an inserter is executing a job for a first publisher for distribution to a particular mailing list. A second publisher who has ads intended for the same addressees on the mailing list would save expenses by adding its ads to the same envelopes, with the first publisher sharing in the savings. Not only do both publishers benefit, but so does the Postal Service, which now has only one mail piece instead of two to be delivered to each addressee.

Many other situations can arise where matching of publisher jobs to printer jobs can profit both sets of entities.

BRIEF DESCRIPTION OF THE DRAWINGS

The foregoing brief description and summary of the invention will become more apparent from the following more detailed description of the invention, accompanied by the attached drawings, wherein.

To best understand the system of the invention, it would be helpful to summarize the network description given in the referenced copending applications, because the same kind of network with only minor changes can be employed in the present invention.

SUMMARY OF PRIOR APPLICATION DISCLOSURES INCORPORATED HEREIN

Figure 1:
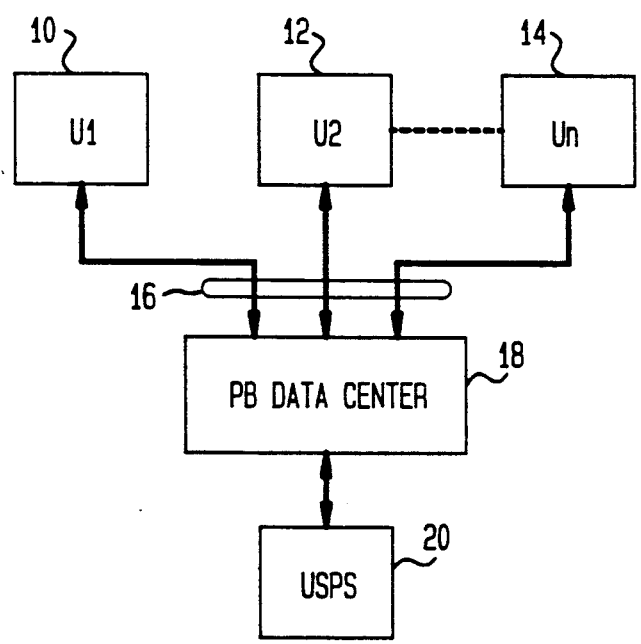
FIG. 1 is a functional block diagram illustrating the relationship between a data center, the U.S. Postal Service, and local users.

With reference to FIG. 1, a plurality of user stations designated as $U_1$, $U_2$ ... $U_n$, and identified as 10, 12 and 14 are shown. It will be understood that multiple user stations are possible in excess of the three shown, and that these are shown by way of example only. These stations are coupled by means of an interconnection data communication network, illustrated generally as 16, to the data center 18, which in turn may be appropriately coupled by means of a secure data line or the like to the U.S. Postal Service 20. The data center is a facility run by a commercial operation, such as Pitney Bowes, Inc., the assignee of the present invention Each of the blocks 10, 12, 14, 18 and 20 contemplate the use of data processing components, each appropriately interlinked by means of high speed telecommunication links or the like for the purposes of exchanging information. It is also contemplated within the scope of the invention that the U.S. Postal Service will maintain an appropriate computer facility, not specifically described herein, which will possess the capability of uploading and downloading specific pieces of information upon request by the data center, and relating to appropriate postal rules and regulations which will effect the use of certain discounts in mailing postal rates, as well as other factors necessary for the concept of shared work services which will be certified by each of the individual user stations in order to qualify for additional discounts when mail is received in the U.S. Postal Service facilities. The specific pieces of information will also be information relating to Postal Service planning and operations, as well as carriers that may be available for use and routing. The communication link is also contemplated as a two-way link between units 18 and 20, wherein the U.S. Postal Service can have, if desired, the capability of monitoring specific operations within the data center in order to ensure the data center is operational in accordance with rules and requirements which may be imposed by the Postal Service from time to time. The monitoring operation can be periodic unscheduled communication link examinations of certain storage areas of accessed memory locations for confirming proper operations. Of course, visual on-site inspections and examinations may also be made.

Figure 2:
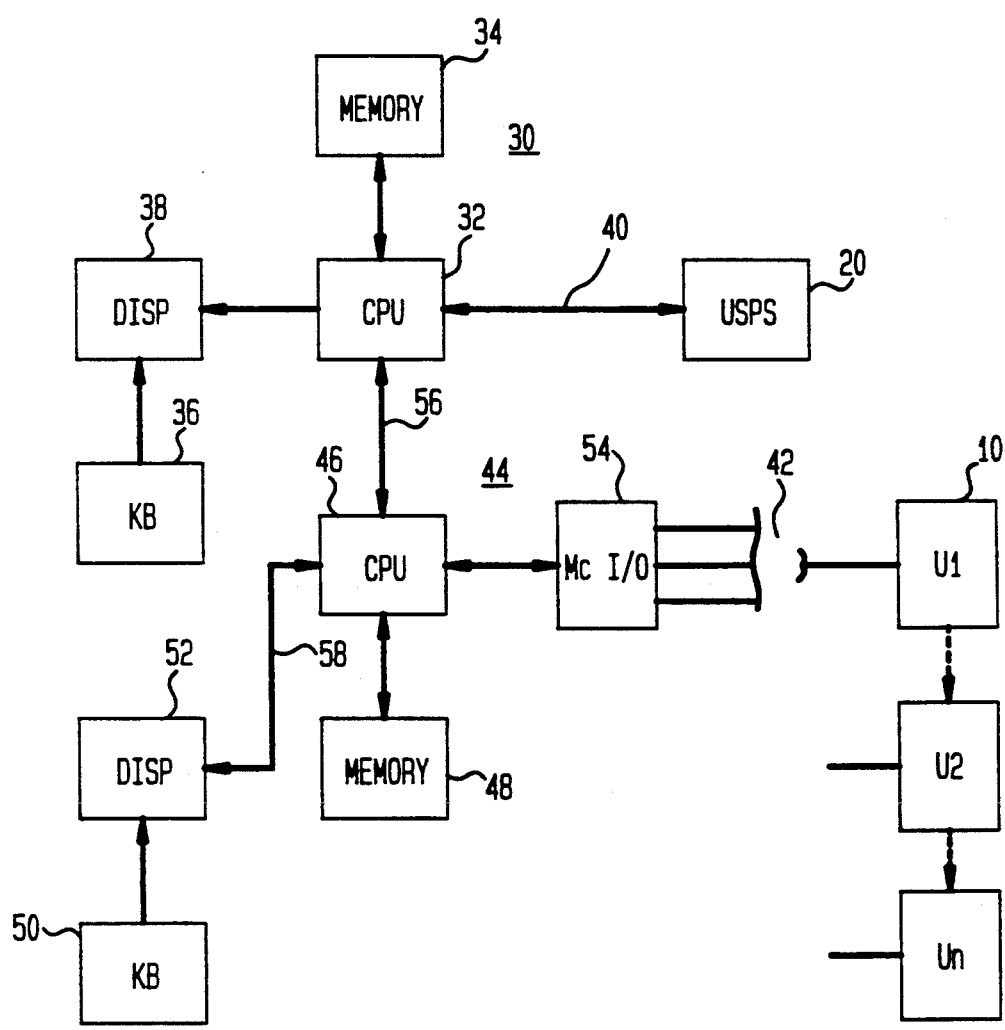
FIG. 2 is a more detailed block diagram illustrating the system of FIG. 1.

With reference to FIG. 2, a more detailed functional component relationship of the system of FIG. 1 is illustrated. Thus, the data center includes a first data channel 30 which includes a CPU 32 having a program memory 34, a keyboard 36 and an appropriate display 38 coupled thereto. Data communication link 40 interconnects CPU 32 to the U.S. Postal Service 20. The user units 10 are coupled via appropriate telecommunication data links 42 to a second data channel 44 which includes a CPU 46, a program memory 48, a keyboard 50 and an appropriate display 52. The CPU is coupled to the data links 42 by means of a multi-channel IO device 54 capable of high speed data communication.

In operation, two-way communication between the data channel 30 and the U.S. Postal Service 20 provide a continuous interchange of information regarding updates of U.S. Postal Service rules and regulations covering rate reductions and as may be required for the continuous certification use by the local users 10. In addition, the data channel 30 may also be manually interrogated by means of keyboard 36 for inquiring of the Postal Service for specific information which may be employed with regard to compliance with certifications, the answering of specific data questions, or other uses requiring specific interrogation by means of the central station to the U.S. Postal Service. Since the U.S. Postal Service link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way communications with respect to continuous update of U.S. Postal Service requirements for certification, servicing and diagnostics, training, and other information interchange, as described in application Ser. No. 285,891, are effected by means of the CPU 46 operating through the high speed data channel 54 interfaced along with communication lines 42 to the multiple user network $U_1$, $U_2$ ... $U_n$. Operating under control of the program memory 48, the CPU 44 is contemplated as a high speed multiple processing information apparatus of conventional design such an IBM 3083 or a CD VAX unit which may handle multiple requests from any one or more of the users simultaneously through the multiple channel I/O device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3:
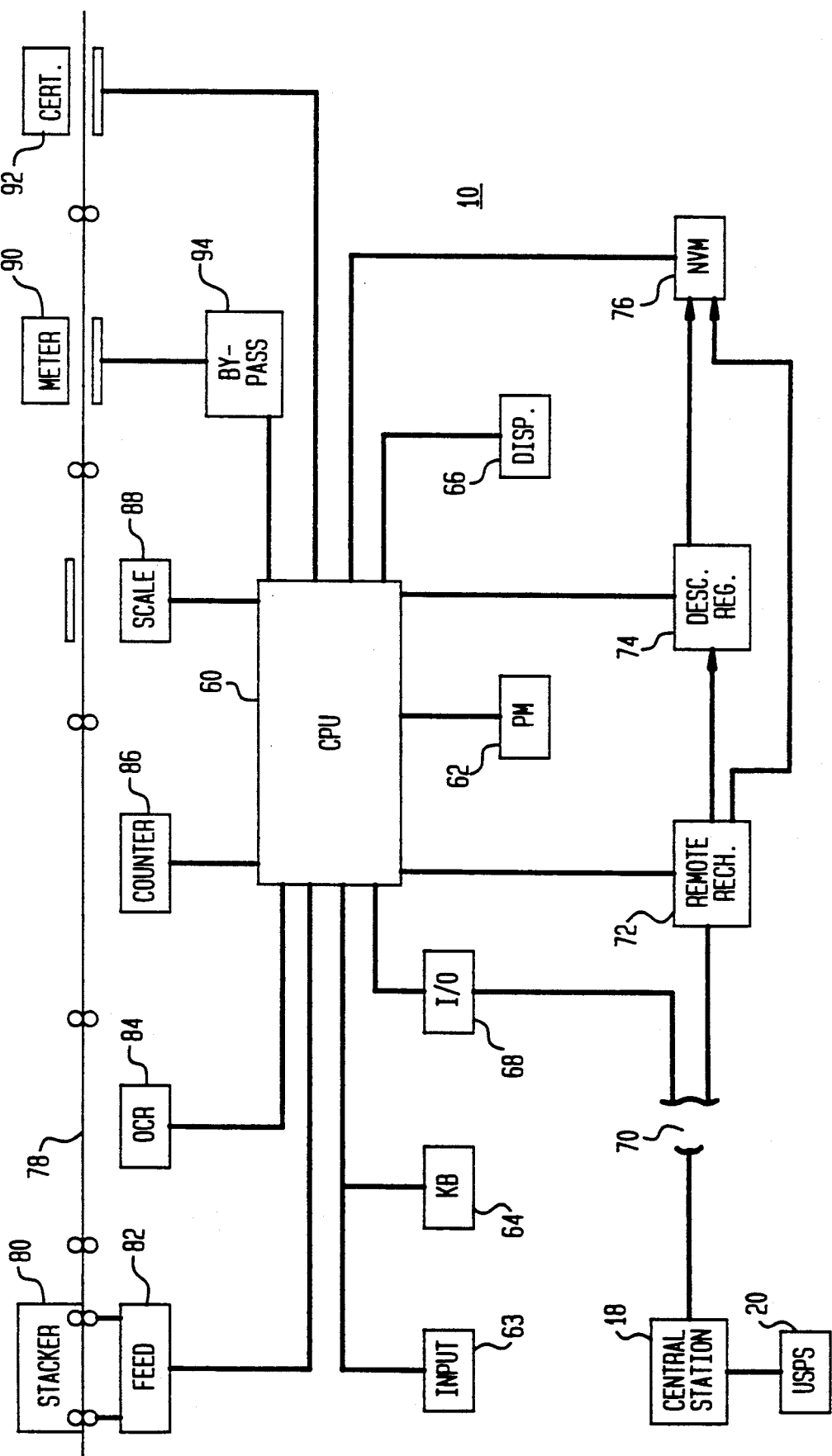
FIG. 3 is a more detailed block diagram illustrating a typical user or mailer station.

Referring to FIG. 3, a function block diagram illustrating the interrelationship of typical components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing, for example, the encryptic key represented by the certification, and interface capabilities with respect to the central station for the downloading of training information which enables operators at local stations to understand and comply with specific requirements imposed by the U.S. Postal Service with respect to the certification process. These capabilities are described in more detail in the related applications Ser. Nos. 285,891 and 285,486. Coupled to the CPU 60 are a keyboard 64 for the manual entry of data requests and other information into the CPU, display unit 66 and an I/O channel 68 coupled by means of a data link 70 to the central station 18. Accounting information and funding to the local user 10 is effected through the data link 70 from the central station 18 to the remote recharger mechanism 72, operating in accordance with conventional recharging techniques, such as disclosed in U.S. Pat. No. 4,797,045, assigned to the assignee of the present application. Remote recharging unit 72 charges a descending register 74, in conventional manner, which keeps track of descending balances charged from time to time in accordance with mail requirements. Non-volatile memory unit 76 is employed to maintain security of information during periods of time when local user unit 10 is not operating. Non-volatile memory 76 receives descending register balances as part of a shutdown routine, along with other security data which may be applied from the active memory of the CPU 60. Remote recharging operations are carried on in remote recharging circuit 72 via the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on times of the unit 10 or in the non-volatile memory 76 during inactive status periods. Another accounting system is described in commonly-assigned U.S. Pat. No. 4,796,193.

A concept of work sharings entail the performance of certain postal service functions by the user in a secure manner so as to enable the user to apply not only postage but to also apply certification, as an imprint on the mail piece, which will be accepted by the postal service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

Certification information is provided to the CPU through a plurality of inputs along a mail path designated as 78. Mail piece documents which are stacked in appropriate feeder-stacker unit 80 are, under control of CPU 60 through feeder-unit 82, driven along the mail path 78, past OCR unit 84 where printed material on the mail piece is read, past counter station 86 where individual pieces are counted, to the scale unit 88 where the mail piece is weighed, and thence to a metering station 90 for application of appropriate postage and finally to a certification station 92 where appropriate certification stamps may be placed on the mail piece to indicate compliance of the mail piece with all the criteria that have been set under work sharing requirements required under relevant U.S. Postal Service regulations. Since the unit may be capable of handling prefranked mail, a meter bypass network 94 operating under control of the CPU, provides for bypassing of the mail piece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in copending application Ser. No. 285,146, U.S. Pat. No. 5,019,991 filed concurrently herewith, and assigned to the assignee of the present application.

The data exchange between the central station and the user station give rise to further novel and unique processing capabilities in accordance with copending application Ser. No. 285,486. The user equipment can be periodically interrogated as to the customer usage patterns, mail runs, addressees, zip codes, rate breaks, etc. Based on this usage information, information can be down loaded to the user. The down loaded information includes advisory procedures, such as the fact that postal charges for first class mail will increase shortly and that any mail run should be pushed out early, the fact that the user has the ability to avail itself of zip code breaks and other useful information as to mailing habits. In mail addressing, the data base incorporated by the central station also can benefit the user by expansion of the user equipment far beyond its limited nature by taking advantage of the relatively larger data base facilities available at the data center. One particularly advantageous use of the communication capability is the uploading of user mailing lists to a data center. At the data center, the information can be processed relative to the data center data base to sanitize the mailing address list. This includes noting improper zip codes, changes in carrier routes, changes in addresses when people move, etc. The information is thereafter down loaded to the user mailing equipment at the user location to allow the generation of sanitized effective mailing lists. This enables the user to have a higher "hit" rate of properly addressed and properly delivered mail. Moreover, the system provides a tremendous advantage to the U.S.P.S. Billions of dollars are spent in redelivering mail which is improperly addressed. Mail can be improperly addressed for a number of reasons including the fact that an individual has moved and the new address data has not been properly entered into the system. By providing this service to, say, the top 500 mailers in the country, which constitutes in the are of 80% of the mail in the country (3rd class), a tremendous amount of expense would be saved by the Postal Service. Where the mailing lists are small, the businesses can upload their mailing lists to the data center. The uploaded mailing address are sanitized and processed, and in this instance, the center can provide the actual mailing service for the small business by providing the printing of the necessary inserts, inserting the material into the envelopes and addressing and distributing them. Alternatively, the center can download the address list to the mail business in the appropriate format. It can also be presorted by order with an indication as to the appropriate postage amount. The postage chargeable when the data center provides the mailing service can be directly charged to a user account. Additionally, demographic analysis can be done on the mailing list to identify additional customers who would fall into similar categories and are not yet being serviced by the small business. Moreover, by demographics analysis, other business opportunities for customers of the type serviced by the small business can be identified and provided to the user. The system would include sufficient security to ensure that the mailing list data for the customer is not improperly utilized. This has been described in more detail and claimed in a copending application Ser. No. 285,145, filed Dec. 16, 1988, and concurrently filed application Ser. No. 416,732 which describes and claims extensions of these concepts.

DETAILED DISCLOSURE OF PREFERRED EMBODIMENTS OF PRESENT INVENTION

For the network described above to be operable for carrying out the present invention, additional entities have to be added. These entities would have on their premises the same kinds of computer equipments described for the users in the earlier network, and other equipment, all of which is conventional and commercially available, for carrying out the functions of that particular entity. Thus, a publisher entity would have the usual resources currently possessed by publishers, including personnel and equipment for creating ad cop and job specifications for that copy. Publishers would also have available a means for recording and storing in their computer the physical parameters and specifications of each ad copy. Moreover, if the publisher also were a mailer, it would have as resources the same mail processing equipment above described for the user stations In addition, the publisher could have the capability to create E-Mail versions of its ad copy, which can then be transmitted over the network or via telephone lines to other entities on the network.

Printer entities would have as resources the usual equipment to convert ad copy into hard copies of the ads, in the final form to be distributed to addressees. Printers sometimes have mail processing capabilities also. That is, not only do they print the hard copies of the ads, they also have the equipment to stuff or insert them into envelopes, seal and stamp them. Printers sometimes have addressing capability. That is, they have addressee files and can use those addressee files to address envelopes for the publisher and then to package those envelopes for delivery to the Postal Service.

Inserter entities, nowadays, have what is known as intelligent inserters which, as previously described, under computer control, provides a series of stations holding multiple copies of a particular insert, and whereby collations are advanced through the machine past each of the stations which are programmed to add inserts to particular collations. At the end of the machine, the collations are stuffed into envelopes which are then sealed and subsequently processed for franking or other postage accounting. An example of one such machine is described in commonly-assigned U.S. Pat. No. 5,003,485, filed Dec. 30, 1988. Commonly-assigned U.S. Pat. No. 4,817,042 also describes a computerized inserter machine for optimizing the final weight of a mailpiece. Inserter entities frequently have equipment for addressing envelopes in accordance with addressee files of particular profiles. In addition, the inserter entities would have the same kind of computer equipment as described for the user station in FIG. 3, that would enable the inserter, as any other entity on the network, to be in regular communication with the data center.

In the system of the invention, the data center maintains a database of publishers and their profiles, and a database of inserters and their profiles. Printers can also be added if desired. Moreover, each of these user entities on the network are continuously uploading to the data center information concerning their current activities and planned future activities. The data center processes this information seeking profitable matches between the various entities. Examples of suitable matches will be given below, but first, reference is made to FIG. 4 which provides a diagram illustrating the relationships among several of the entities.

Figure 4:
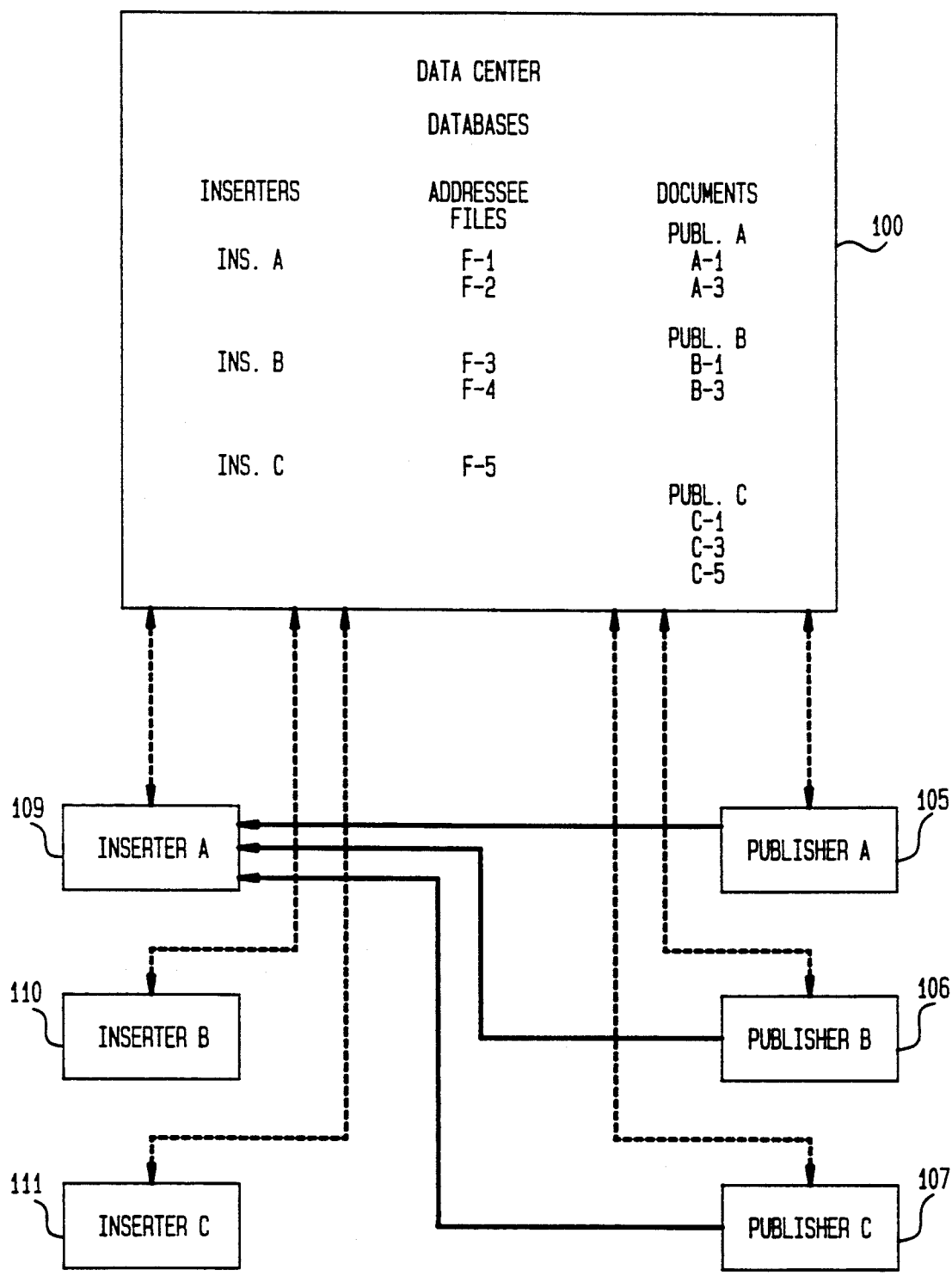
FIG. 4 is a schematic diagram illustrating operation of one form of system according to the invention.

In FIG. 4, the data center is represented by block 100. It maintains databases of publishers on the network, represented by blocks 105, 106 and 107, and databases of inserters on the network, represented by blocks 109, 110, and 111. Each of the latter is in continuous communication with the data center, represented by the double-arrow-ended dashed lines. As a result of these communications, the database has stored the following information, as an example only. Publisher A has ads A-1, and A-3 to be distributed, respectively, to addressees in files F-1, and F-3. Publishers B and C also have ads as similarly labelled in block 100 to be sent to the addressee files indicated by the suffix. Note that all three publishers, operating independently, have created ads intended for addressees with the profiles of the F-1 file.

The inserters can be located in different geographic regions. Their capabilities to insert the ads of the publishers, whose specifications may be maintained at the data center, is readily determined by the data center. Due to continuous on-line communications, the data center can choose an inserter for a particular job and take into account not only equipment and other resources available to each inserter, but also current workloads and the ability to complete the job within the time frame desired by the publisher. Another important factor easily included in the data processing is the locations of the addressees relative to the location of the inserters For instance, suppose that addressee file F-1 is composed of addressees located in a certain region of the country. These addressees are to receive, say, a monthly statement from a utility, credit car company, or bank, and/or additional messages or ads. Distribution of this information or ads to such addressees would be expedited by choosing an inserter located in that region if the selected inserter had the resources to make up the mailings to those addressees and deliver to the local Post Office. So, already valuable benefits accrue both to the publishers and inserters as a result of the operations of the data center, as an independent entity, in maintaining these databases of publisher and inserter activities.

But, other even more valuable benefits can be obtained from the system of the invention. Suppose Inserter A has been hired to insert ad A-1 from Publisher A into envelopes, seal, address to addressees on file F-1 and deliver to the local Post Office. The data center has detected from its databases that Publishers B and C also have ads intended for the same addressees in addressee file F-1. Accordingly, Publishers B and C are notified to forward their copy to Inserter A to include in the same envelopes that will contain Publisher A's copy. All members of the system gain from this example of co-mail. Postage costs are minimized, as it may not cost too much more to add Publisher B's and C's documents to the common envelope. Moreover, distribution to the addressees due to use of local Post Offices is expedited. The Postal Service benefits, as it now has only to deliver one letter instead of three.

There are many other ways in which the co-mail principle can be applied to benefit the network entities. Suppose that Inserter B has received an order from Publisher B to print and mail documents B-3 to addressees listed in file F-3. The data center is informed. The data center, storing profiles of the publisher's activities, knows that Publisher C also frequently creates copy for addressee file F-3. The data center can then advise Publisher C that Inserter B is inserting documents for distribution to addressees in file F-3, that the weight of the documents from Publisher B is only one-half of the weight allowed for the postage to be supplied, and thus envelope capacity is available if copy for the same set of addressees exist and is forwarded to Inserter B in time. They then can be added to the existing envelopes for no additional postage. Thus, the postage costs for Publishers B and C are halved in this example of co-mail.

The previous example is just one instance of how the data center, knowing from its up-to-date databases of current and prospective inserter jobs, can easily process its stored information to find publishers that can utilize excess envelope capacity developed by the inserters. This not only saves postage costs in the distribution of the ads, but also will allow speedier distribution of the ads to the intended addressees. Moreover, the data center can contribute additional value to the networked entities by participating in the delivery of the ads or physical inserts from the publishers to the inserters. So, for example, if the ads are created on a desktop publishing workstation, they can be transmitted electronically over the network to the data center, and then from the data center to the selected inserter. If in physical form, the ads can be delivered to personnel at the data center who would then arrange for delivery to the inserter.

Another valuable contribution of the data center is accounting for the networked entities. The data center can maintain accounts for the networked entities, and credit inserter's accounts for payments by publishers and similarly debit the publisher's account. In the system of FIG. 2, wherein the Postal Service can be linked to the network, payments to the Postal Services for postage can be accomplished by the data center on behalf of inserter mailers. Also the data center as a third party can fairly allocate any postage savings among the operating entities. Commonly-assigned U.S. Pat. No. 4,837,701 also describes an accounting system employing a central station, whose principles and configuration can also be used herein for payment accounting.

There are still other ways in which a data center, linked in a network with and possessing information concerning activities of mail publishers and mail inserters, can benefit the entities involved. Another important way is by providing value-adding-information to users with limited resources of their own. For instance, a data center subsidized by many users can compile and process much valuable information for entities on the network. Thus, there are organizations that create demographics information on individuals and families throughout the country. The cost of acquiring such information and customizing it for particular publishers or its customers can be prohibitive for one entity, but affordable when performed by the data center for many entities. The data center can use this demographics information to update addressee files of inserters and publishers, to add or delete addressees, or to form smaller sets of addressees for more focussed merchandising.

This is of benefit to the networked entities because the value of addressee files used by inserters to publishers depends upon its accuracy and its granularity, i.e., the finer grained the listings, meaning, the finer subdivided the addressee sets can become, the more effective will be target marketing and pinpointing of potential customers. Such demographics information is available from several institutions. For instance, LPC, a Pitney Bowes company, provides a Geographic Data File which is a directory of geographic locations cross-referenced by zip code. This information is readily appended via known software to an address in a database file of addressees. Similar software is available for adding demographics data broken down into over 300 variables for many target marketing applications.

Figure 5A:
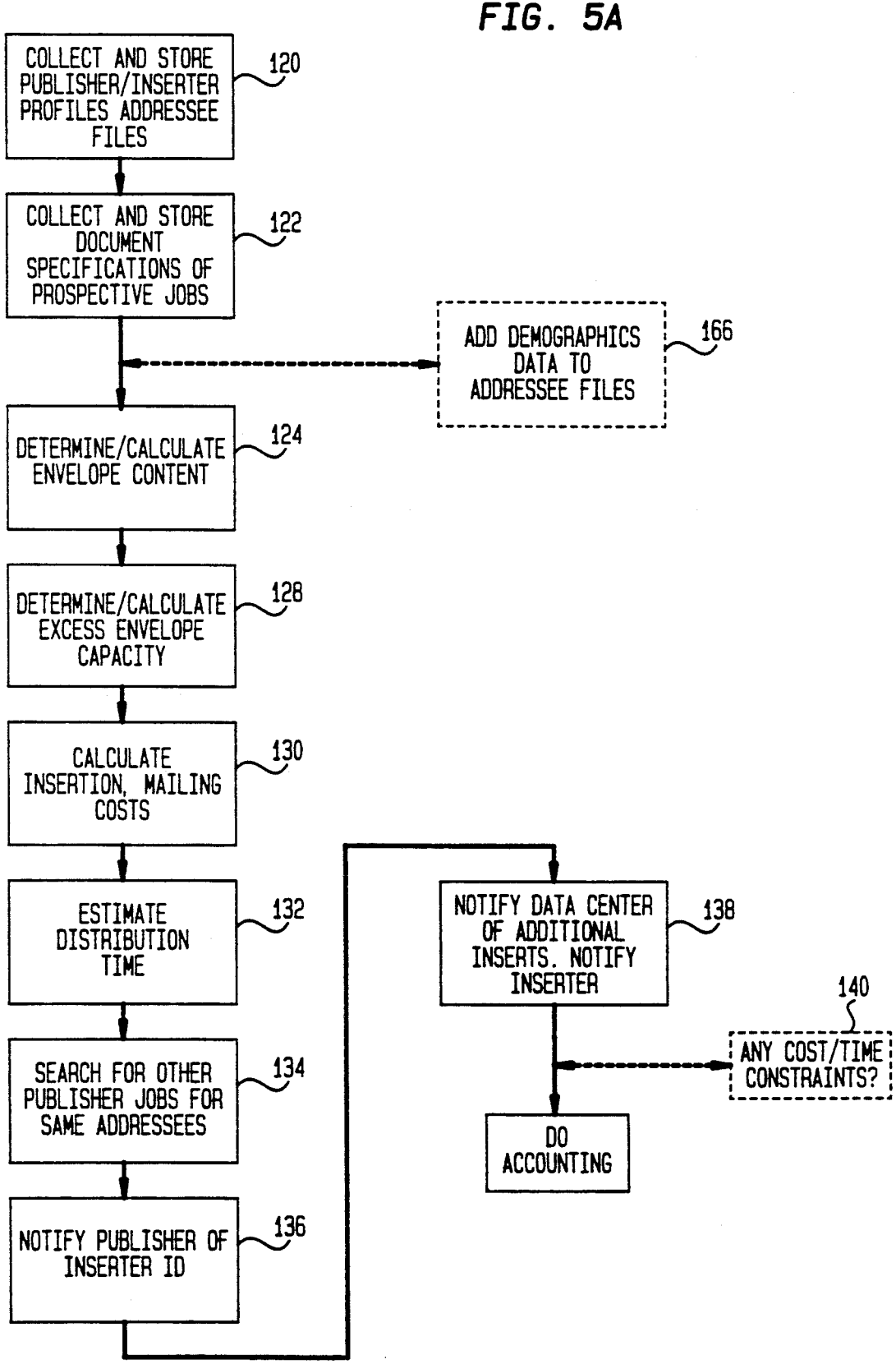
FIGS. 5A and 5B are flow charts depicting several typical processing operations of a system according to the invention.
Figure 5B:
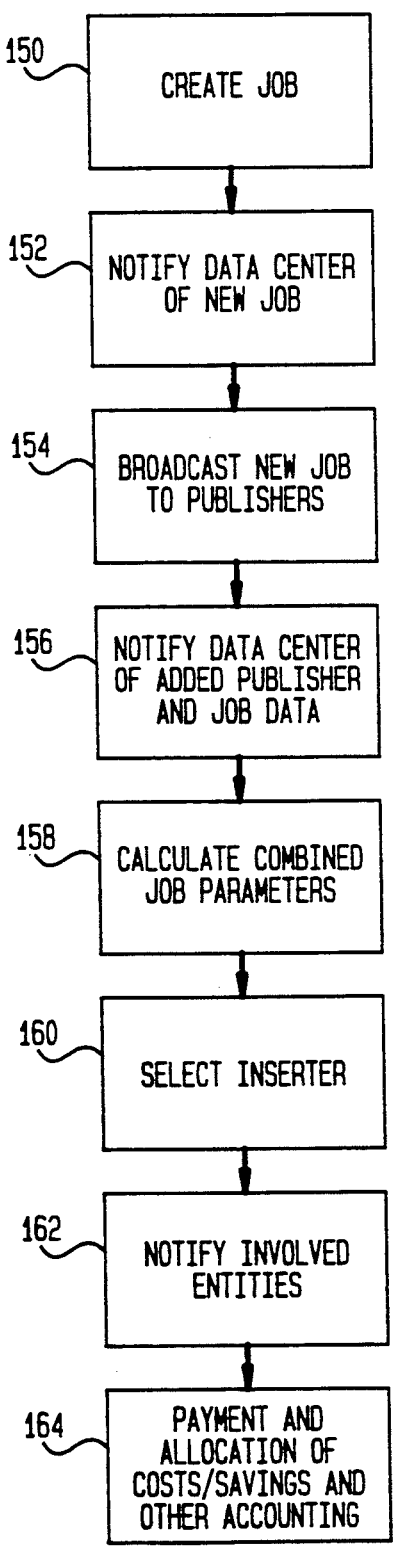

FIGS. 5A and 5B are flow charts depicting typical sequences in the operation of the system of the invention. In block 120 of FIG. 5A, the data center uploads from each of the entities on the network the necessary information to establish profiles of the business activities of the publishers and inserters, which profiles would assist matching publisher jobs to inserter jobs or capabilities. In addition, the data center would store addressee files available to inserters or mailers or used by publishers for their ads:

In block 122, the inserters upload to the data center data representative of current and prospective jobs, which would include the type, weight and size of ads, volume of ads, envelope types to be used, and for which set of addressees intended.

The data center would then process the information it has stored, using known database processing techniques, to determine by calculations the ad content of the envelope block 124, whether excess envelope capacity will be available at block 128, insertion and mailing costs at block 130, and estimated distribution time at block 132. Then, at block 134, the data center computer, using known database processing techniques, would scan through the stored data seeking other publisher jobs intended for the same set or subset of addressees and that would fit the available excess envelope capacity. At block 136, the identified publishers are notified of the pending inserter job. Assuming a publisher decides to take advantage of this opportunity, at block 138 the data center is notified, which in turn notifies the inserter to put the job on hold pending receipt of the additional inserts from the second publisher to be added to the collation to be stuffed into the envelopes to be addressed to particular addressees. The addressing can take place at the inserter or at a third party mailer or at a publisher. The publisher selection, if desired, could take into account any time and cost constraints imposed by the publisher, shown at block 140 in dashed lines. If more than one publisher decides to use the excess envelope capacity then the selection could be based on such factors as geographic location of the second publisher relative to the inserter involved. If necessary, the data center can become involved in transmitting the new inserts, in physical or electronic form, to the involved inserter, and also in the accounting of the transaction shown at the block 142.

FIG. 5B shows a variation. In this sequence, a publisher decides to mail certain inserts to a set of addressees, at block 150. The publisher notifies the data center of this prospective job and its specifications at block 152. At block 154, the data center broadcasts this prospective job to other publishers who may desire to share the available envelope space to reduce costs. Assuming a second publisher decides to accept this opportunity, the data center is notified at block 156, together with specifications on these new inserts. At block 158, the data center calculates the job parameters, determines from its database of inserter profiles which inserter is best suited, at 160, to execute the job, based on time and resource availability, and notifies, at 162, the entities now partaking in this co-mail venture. This broadcasting sequence, originating with a publisher, can also originate with an inserter, for example, during a slack period and seeking additional work, perhaps at a discount. The inserter if a mailer may also have proprietary addressee files, whose availability can be broadcast to the publishers for their use. The previous sequence of steps involving calculating envelope capacity and seeking additional inserts to fill available envelope space can also be followed in this example. The data center can also scan through its stored listing of documents or jobs and prospective jobs to determine whether any would qualify for incorporation in those envelopes. In other words, if there are any other mailings available destined for the same set or for a subset of the addressees, the publishers of those jobs would be notified that a job is being executed destined for a set of addressees to whom the publisher also intends to send documents; hence considerable savings in time and money are available by taking advantage of unfilled envelopes destined for those addressees.

Finally, in block 164, the data center, if desired, can arrange for payment to the inserters upon completion of the jobs, and debiting the account of the involved publisher, if alone, or allocating the cost thereof among the cooperating publishers in accordance with any formula agreed by the publishers.

As shown in dashed lines in FIG. 5A, at block 166, if desired, demographics data can be added to the stored addressee files for targeting refined subsets of addressees. These augmented files can be returned via the network to the owner, inserter or printer, or stored at the data center.

As noted, by relatively simple, straightforward programming, the matching of publishers to inserters can be readily optimized in accordance with the needs and resources of the entities involved to the benefit of all members on the network. The public benefits because reduced distribution costs will be reflected in reduced merchandise prices, and because, for the same and in most instances improved targeting of prospective purchasers and reduced mailings, the involved Postal Service operations are also reduced.

The system and methods described herein can be used alone, or in combination with many of the systems described in the referenced copending applications. For example, the concurrently-filed application Ser. No. 416,732, describes a similar network in which the entities matched are publishers and printers. That system is readily adapted to be consolidated with the present system by adding printers to the network as there described. Also, as another example, the referenced copending applications Ser. Nos. 285,145 and 285,486 relate, respectively, to networks which allow updating of customer lists by a data center, and to networks in which a data center creates databases of mailer activities for selective accessing by mailers to improve their operations. Those systems are readily integrated with the system of the present invention, since the same equipment can be used, the major difference being the information stored at the data center and the data processing criteria. The same applies to the certification system described in application Ser. No. 285,891, U.S. Pat. No. 5,008,827.

It will be evident to those skilled in the art that, from the network descriptions given herein and in the referenced Applications, it is a relatively straightforward development to construct such a network and establish the data communications links that will allow the data center to perform the functions described herein. Also, those skilled in the art will recognize that creation of the databases described, and programming of the data center computer to process the stored information to make the desired matching of publisher to inserter is also a straightforward project development using programming and development tools available from many vendors. Any known, suitable, matching or selection algorithm can be employed, in addition to the preferred ones described above. The processing time is not critical, and thus, while desirable, it is not critical to the invention that the databases are built and processed rapidly or that access time to the network is short.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. Apparatus for performing mail processing functions for postal system users, said apparatus comprising:
   a data center having a data processor and means for receiving via a data communications link and storing data representative of:
   (a) activity profiles of plural inserter entities having intelligent inserter equipment,
   (b) current or planned mail documents to be generated by a plurality of publishers;
   means for processing said data to determine which of said mail documents should be forwarded to which of said inserter entities to reduce costs or expedite distributing of said documents to addressees.

2. Apparatus as claimed in claim 1, wherein the activity profiles include addressee files available to the inserter entities and available envelope capacity for determined addressees.

3. Apparatus as claimed in claim 2, further comprising means at the data center for storing demographics data on prospective addressees and for transmitting said data to an inserter entity.

4. A system for performing mail processing functions, comprising:
   (a) a data center having a data processor and storage means,
   (b) a plurality of entities having intelligent inserters for inserting documents into mailing envelopes,
   (c) a plurality of entities performing publishing functions and capable of generating documents or document specifications for documents for distribution to a set of addressees,
   (d) a data communication network interconnecting the data center with the inserter and publishing entities whereby said inserter entities can transmit to the data center data representing their inserter activities including mailing envelope capacities and addressee files, said data center data processor storing said data transmissions in said storage means,
   (e) said data center processing said stored data for selecting any of the publishing entities on the network that can utilize particular inserter envelope capacities or addressee files for its documents for distribution to said addressees,
   (f) means for transmitting to said selected publishing entities the identity of said particular inserters and its available envelope capacities or addressee files.

5. The system of claim 4, further comprising means at said data center for supplying to particular inserter entities via the network demographics data on the inserter's addressee files.

6. The system of claim 4, further comprising means at the data center for processing the addressee files of inserter entities to add demographics data and for transmitting the processed addressee files back to the inserters.

7. The system of claim 4, further comprising means at the data center for arranging payment to inserter entities for including in envelopes documents originating at particular publishing entities.

8. In a mailing processing method, the steps comprising:
 (a) interconnecting via a network, plural independent mailers of advertising documents having intelligent inserters for inserting documents into envelopes for mail distribution to a plurality of addressees, plural independent publishers of advertising documents, and a data center having data processing facilities,
 (b) compiling a database of addressees and a database of addressee profiles and a database of documents to be distributed,
 (c) determining which documents from the plural publishers are relevant to which addressees, and
 (d) transmitting to the mailers and to the publishers information enabling the mailers to receive from the publishers those documents which can be combined into a single mailing to a particular addressee.

9. In the method of claim 8, including the steps of compiling a database of excess envelope capacity available at particular mailers for particular addressees, transmitting via the network to the publishers data representative of the excess envelope capacity available at mailers whereby the publishers can utilize said excess envelope capacity for their own documents.

* * * * *